United States Patent [19]

Tanigawa et al.

[11] 3,883,890

[45] May 13, 1975

[54] DEVICE FOR DETECTING THE ROTATING PHASE OF ROTARY MAGNETIC HEADS OF VIDEO TAPE RECORDING APPARATUS

[75] Inventors: Shizuhiko Tanigawa; Shozo Kanda, both of Osaka, Japan

[73] Assignee: Matsushita Electric Industrial Co., Ltd., Osaka, Japan

[22] Filed: Oct. 15, 1973

[21] Appl. No.: 406,537

[30] Foreign Application Priority Data

Oct. 20, 1972 Japan ........................ 47-121616[U]

[52] U.S. Cl. ...................... 360/31; 360/70; 360/128

[51] Int. Cl. ........................ G11b 27/36; G11b 21/04

[58] Field of Search ....... 360/31, 70, 128, 129, 104, 360/75; 324/179, 82, 173; 73/2

[56] References Cited

UNITED STATES PATENTS

| | | | |
|---|---|---|---|
| 3,277,236 | 10/1966 | Machein | 360/70 |
| 3,288,923 | 11/1966 | Arimura | 360/70 |
| 3,292,082 | 12/1966 | Braine | 324/82 |
| 3,524,103 | 8/1970 | McCune | 324/179 |

*Primary Examiner*—Bernard Konick
*Assistant Examiner*—Alan Faber

[57] ABSTRACT

A device for detecting the rotating phase of rotary magnetic heads of a video tape recording apparatus in order to synchronize the rotation of the rotating heads with the synchronizing signals recorded, or to be recorded on the video tape is disclosed. A magnet piece is positioned upon a rotating disc or drum carrying rotary magnetic heads adjacent to one of rotary heads, and detecting coils as a phase detecting elements are mounted upon mounts in such a way that they may be movable along the path of the magnet piece. One end of each of mounts disposed on a stationary drum, upon which is mounted the rotating disc or drum, extends beyond the outer periphery of the stationary drum and terminates into a toothed portion adapted for engagement with a pinion of an adjusting tool, so that the angular position of the detecting coil may be adjusted by rotating the adjusting rod. This adjustment may be accomplished from the exterior of the rotary head assembly while the tape is transported, so that an operator may immediately check the result of the adjustment over a monitor.

4 Claims, 5 Drawing Figures

DEVICE FOR DETECTING THE ROTATING PHASE OF ROTARY MAGNETIC HEADS OF VIDEO TAPE RECORDING APPARATUS

BACKGROUND OF THE INVENTION

The present invention relates to a device for detecting the rotating phase of rotary heads of a video tape recording apparatus.

In a rotary head type video tape recording apparatus, the rotating phase of rotary heads must be synchronized with the synchronizing signals of picture signals to be recorded. The conventional device for detecting the rotating phase of the rotary heads comprises a magnetic piece positioned adjacent to one of the rotary heads, and detecting coils positioned in opposed relation with the path of said magnetic piece for detecting the latter, and hence the rotating phase. In order to adjust the phases of the output signals of the detecting coils, the rotation of the rotary heads and the transport of the video tape must be stopped to adjust the angular positions of the detecting coils, so that the phase adjustment cannot be monitored. Therefore after the adjustment of the positions of the detecting coils is made, the video tape recorder is turned on to transport the tape thereby confirming whether the adjustment is satisfactory or not. If not satisfactory, the adjustment must be repeated. Therefore the adjustment of the positions of the detecting coils of the conventional device is very tedious. Furthermore the magnetic piece and the detecting coils are generally disposed within a guide drum whose space is very limited, so that the fine adjustment of the detecting coils is adversely affected by the presence of parts associated with the tape guide drum.

SUMMARY OF THE INVENTION

The present invention was made to overcome the above and other problems encountered in the conventional devices for detecting the rotating phase of the rotary heads.

One of the objects of the present invention is, therefore, to provide a device for adjusting the rotating phase in a very simple manner within a short time and with a higher degree of accuracy.

According to the present invention, fine adjustment of the position of the detecting coils becomes possible while the video tape is in motion, so that the operator may watch the result of the adjustment on a picture monitor.

Another object of the present invention is to provide a device which permits the simple phase adjustment from the exterior of the rotary head assembly or head cylinder.

A further object of the present invention is to provide a device in which the adjustment of the angular position of one mount, upon which is mounted a phase detecting element, automatically causes the adjustment of the angular positions of other mount and hence of the other phase detecting element.

A still further object of the present invention is to provide a device capable of finely adjusting the rotating phase of rotary heads to a condition of phase synchronization with the vertical synchronization pulses of the video signal to be recorded. Thus the rotational position of the recording head may be synchronized with the phase of the vertical synchronization pulses.

Briefly stated, according to the present invention, detecting means consisting of, for example, a magnetic piece and detecting coils is so arranged that the magnetic piece is positioned adjacent to a rotary head and the detecting coils are located in opposed relation with the magnetic piece, that is, the path of the magnetic piece or vice versa. The detecting coil or the magnetic piece may be displaced substantially along the path of the magnetic piece or detecting coil from the exterior of the rotary head assembly while the tape is transported so that the operator may observe the result of the adjustment.

The above and other objects, features and advantages of the present invention will become more apparent from the following description of preferred embodiments thereof taken in conjunction with the accompanying drawings.

Figure 1:
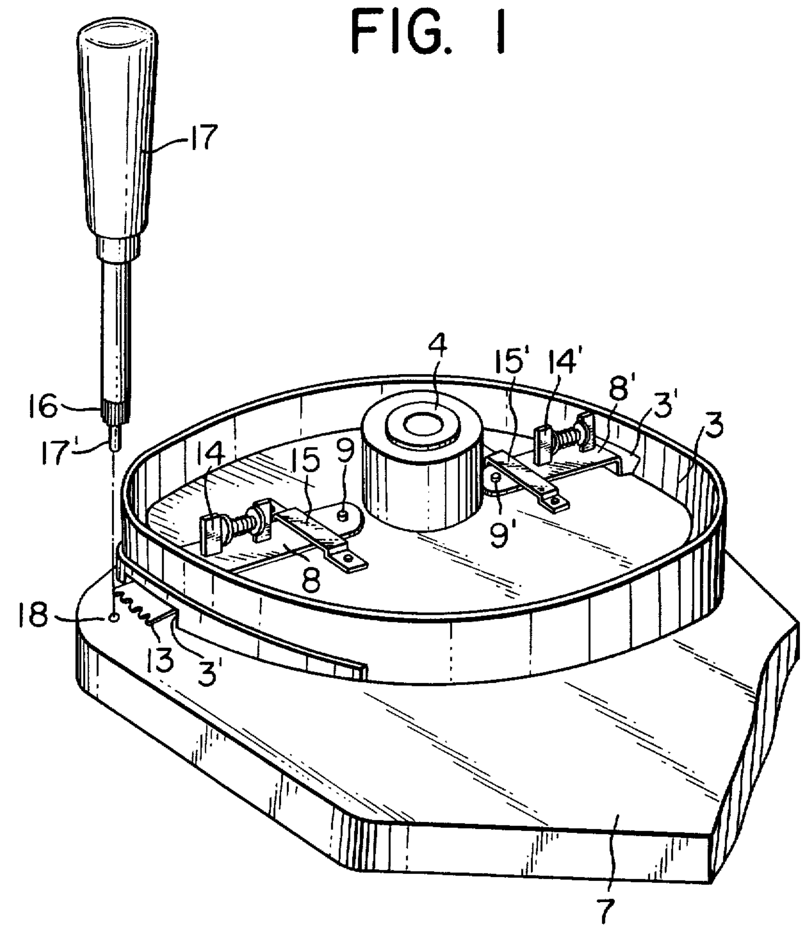
FIG. 1 is a perspective view of a first embodiment of the present invention.
Figure 2:
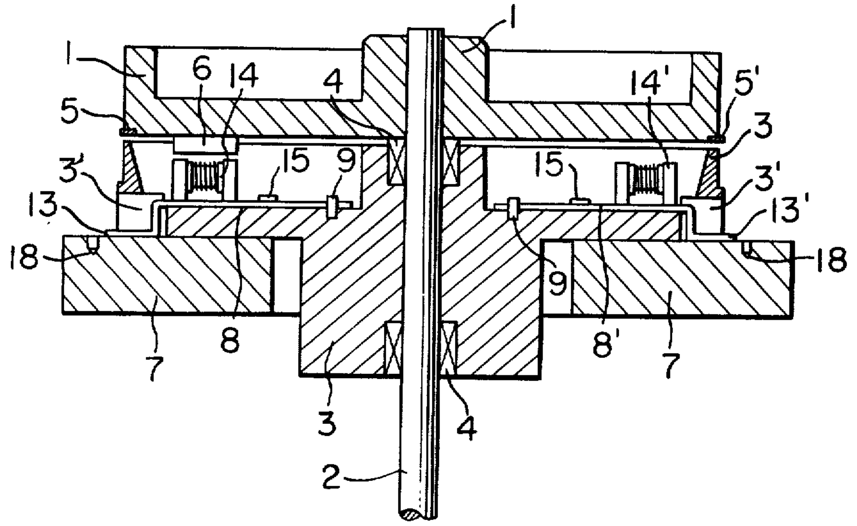
FIG. 2 is a sectional view thereof.

DESCRIPTION OF THE PREFERRED EMBODIMENTS:

First Embodiment, FIGS. 1 and 2

Referring to FIGS. 1 and 2, a rotating drum 1 is fixed to a shaft 2 which is supported by bearings 4 fixed to a cylindrical stationary drum 3 and is driven by a motor (not shown). The tips of magnetic heads 5 and 5' are positioned symmetrically with respect to the axis of the shaft 2 and extend radially outwardly beyond the outer periphery of the rotating drum 1. A magnetic piece 6 made of iron or suitable magnetic material is positioned upon the rotating drum 1 adjacent to the magnetic head 5.

Within the stationary drum 3 which is fixed to a base 7 are disposed mounts 8 and 8' for mounting thereupon coils 14 and 14' for detecting the rotating phase of pivotal movement about pivot pins 9 and 9', respectively, which are positioned symmetrically with respect to said axis of the shaft 2. The free ends of said mounts 8 and 8' terminate into toothed portions 13 and 13' which extend through slits 3' formed through the side wall of the stationary drum 3. Said coils 14 and 14' are positioned in opposed relation with the magnetic piece 6, and that are adjustment the path of said magnetic piece 6. Leaf springs 15 and 15' press said mounts 8 and 8', respectively, against the bottom of the stationary drum 3 so as to hold said mounts in position.

Next the mode of operation will be described. To adjust the phase of the rotary heads, a guide pin 17' of an adjustment tool 17 having an externally toothed portion or pinion 16 at its lower end is fitted into a guide hole 18 drilled into the base 7 adjacent to the toothed portion 13 of said mount 8 so that the externally toothed portion or pinion 16 engages with the toothed portion 13. As the adjustment tool 17 is rotated, said mount 8 is caused to rotate about said pivot pin 9 against the leaf spring 15. As a result the position of said detecting coil 14 is slightly displaced along the rotating path of the magnetic piece 6, so that the phase of the output signal of the detecting coil 14 with respect to the rotating phase of the rotary head may be adjusted.

Figure 3:
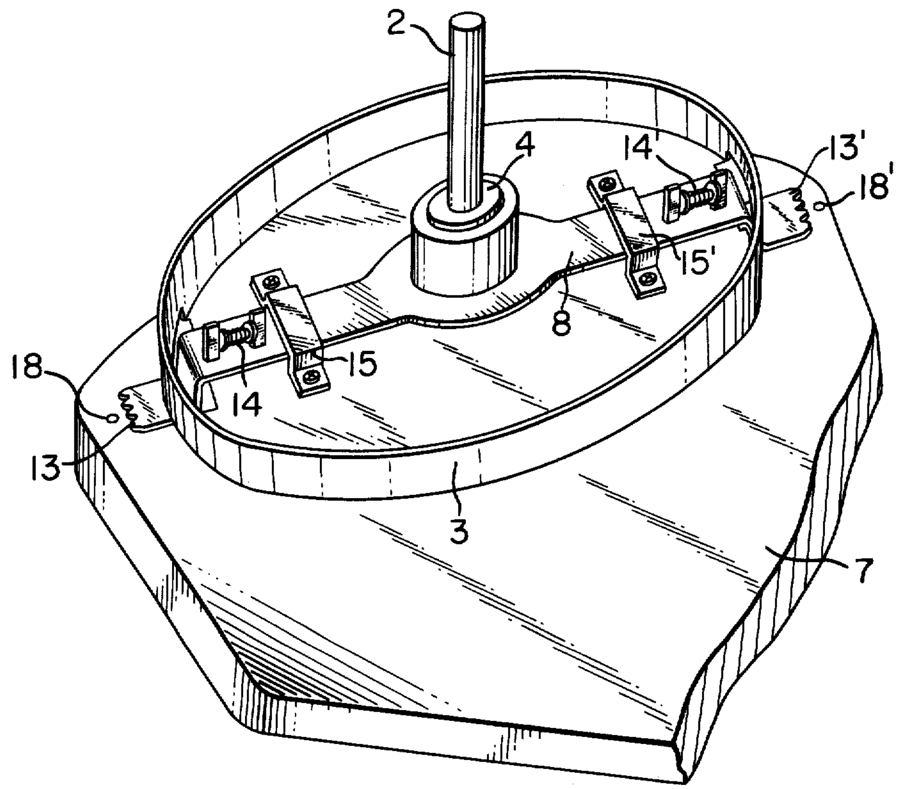
FIGS. 3, 4 and 5 are perspective views of a second, third and fourth embodiments of the present invention, respectively.

Second Embodiment, FIG. 3

The second embodiment shown in FIG. 3 is substantially similar in construction to the first embodiment described hereinbefore with reference to FIGS. 1 and 2 except that, instead of two separate mounts 8 and 8', a unitary mount 8 is rotatably fitted over the shaft 2, because it is preferable to displace the detecting coils 14 and 14' exactly along the path of the magnetic piece 6. Further advantages of the second embodiment are that the phase relation between the detecting coils 14 and 14' may be maintained constant; that the positions of the magnetic piece 6 and the detecting coil 14 are interchangeable; and that instead of the magnetic piece 6 and the detecting coil or coils 14 and 14', a light source and photoelectric cells may be used.

Figure 4:
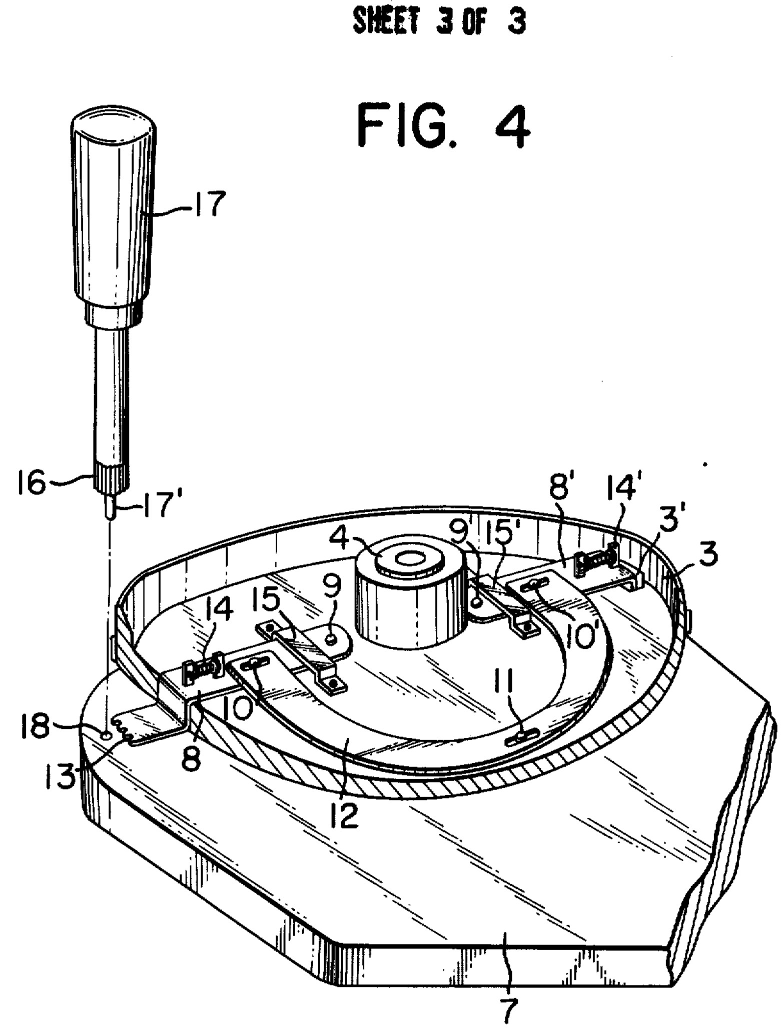

Third Embodiment, FIG. 4

The third embodiment shown in FIG. 4 is substantially similar to the first embodiment except that the two mounts 8 and 8' are interconnected by a horseshoe-shaped member 12. That is, slots formed through the end portions of said connecting member 12 are fitted over pins 10 and 10' extended from the mounts 8 and 8', respectively, and an elongated slot formed at the midpoint of said connecting member 12 is fitted over a pin 11 extended from the stationary drum 3. Therefore when the angular position of the mount 8 and hence the angular position of the detecting coil 14 is adjusted in a manner substantially similar to that described hereinbefore, the position of the mount 8' is also adjusted through said connecting member 12. The relation between the angular positions of the mounts 8 and 8' may be maintained constant. Therefore the relationship between the phases of the output signals of the detecting coils 14 and 14' may be maintained constant while the relationship between the rotating phase of the rotary head and the phase of the output signal of the detecting coils is altered.

Figure 5:
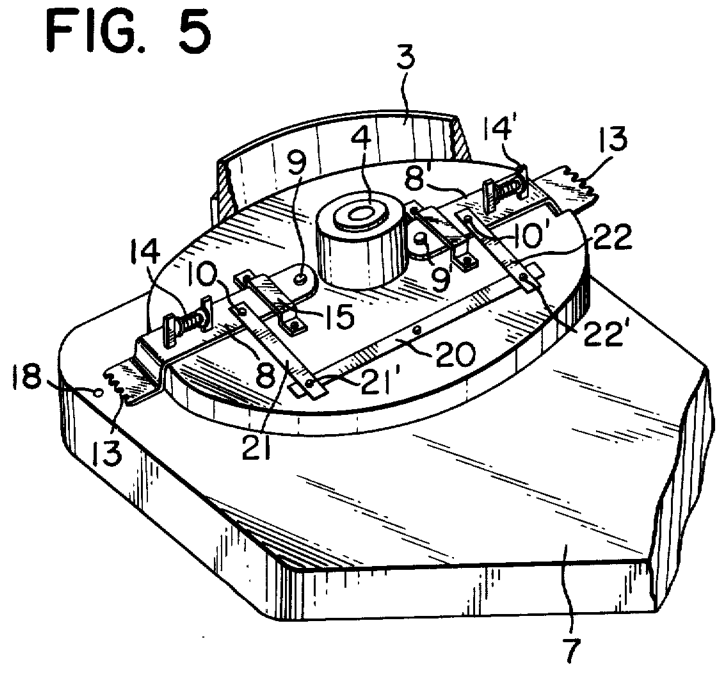

Fourth Embodiment, FIG. 5

The fourth embodiment shown in FIG. 5 is substantially similar to the fourth embodiment except that instead of the single connecting member 12 a linkage consisting of a first, second and third levers 20, 21 and 22, respectively, is used to interconnect the mounts 8 and 8'.

One ends of the second and third levers 21 and 22 are pivotally mounted on the ends of the first lever 20 with pins 21' and 22', respectively, and the other ends are pivotally mounted on the mounts 8 and 8' with pins 10 and 10', respectively. The first lever 20 has its midpoint pivoted to the bottom of said stationary cylinder 3 with a pivot pin. It is seen that when the angular position of the mount 8 is adjusted in a manner substantially similar to that described hereinbefore the other mount 8' is also adjusted through the linkage.

As described hereinbefore the free ends of the mounts terminate into the toothed portions 13 and 13', so that the fine adjustment may be accomplished in a simple manner from the exterior while the operator is watching a monitor.

What is claimed is:

1. A device for detecting the rotating phase of a rotary magnetic head of a video tape recording apparatus comprising a. a base;

b. a stationary cylindrical drum mounted upon said base;

c. a rotating member mounted above said stationary drum for rotation about the axis thereof, the walls of said rotating member being defined by a round cylindrical surface;

d. a plurality of magnetic heads provided with tips and mounted upon said rotating member, the tips of said plurality of magnetic heads extending radially outwardly beyond the outer periphery of said rotating member;

e. means for detecting the passage of said plurality of magnetic heads through a predetermined position, said detecting means comprising a plurality of first detecting elements positioned beneath said rotating member, each first detecting element being aligned with each of said plurality of magnetic heads and within the cylindrical surface defining said rotating member, and a second detecting element mounted upon an upper surface of said stationary drum in opposed relation with the path of said first element on said rotating member;

f. means for angularly displacing said second detecting element upon said stationary drum along said path of said first detecting element, thereby adjusting the mutual angular positions of the detecting elements from the exterior of the rotary head assembly while said video tape recording apparatus is transporting the video tape; and g. said means for positioning said second detecting elements upon said stationary drum comprising a plurality of mounts equal in number to said second detecting elements; one end of each of said plurality of mounts being equiangularly pivoted on said stationary drum symmetrically with respect to the axis of said rotating member and as close to the axis of said rotating member as practicable so that they are movable substantially about the axis of said rotating member; and wherein the side wall of said stationary drum is provided with slits, the other end of each of said plurality of mounts extending radially beyond the outer periphery of said stationary drum through said slits formed through the side wall thereof.

2. A device as defined in claim 1 wherein said other end of each of said plurality of mounts terminate into a toothed portion adapted to mesh with a pinion at the lower end of an adjusting rod for the adjustment of the angular position of said mount and hence said second detecting element.

3. A device as defined in claim 1 wherein the number of said second detecting elements are two; and said means for positioning said second detecting elements comprises a mount disposed upon said stationary drum so as to be rotatable about the axis of said rotating member;

said two second detecting elements being mounted upon said mount at the both side thereof symmetrical with respect to the axis of said rotating member.

4. A device as defined in claim 1 wherein the number of said second detecting elements are two; and said means for positioning said second detecting elements upon said stationary drum comprises a pair of mount whose one ends are pivoted to said stationary drum symmetrically with respect to the axis of said rotating member and as close to the axis thereof as practicable so that they are rotatable substantially about the axis of said rotating member;

the other ends of said pair of mounts extending radially outwardly beyond the outer periphery of said stationary drum; and a linkage interconnecting said pair of mounts in such a way that a predetermined relative angular position between said two second detecting elements may be maintained when they are rotated about their pivot points for adjustment of the angular positions thereof.

* * * * *